(12) United States Patent
Schill et al.

(10) Patent No.: US 9,581,070 B2
(45) Date of Patent: Feb. 28, 2017

(54) UNCOUPLING ELEMENT

(71) Applicant: BOA Balg- und Kompensatoren-Technologie GmbH, Stutensee (DE)

(72) Inventors: Andreas Schill, Stutensee (DE); Marc Pontzen, Speyer (DE); Stefan Neff, Hagenbach (DE)

(73) Assignee: BOA Balg-und Kompensatoren-Technologie GmbH, Stutensee (DE)

( * ) Notice: Subject to any disclaimer, the term of this patent is extended or adjusted under 35 U.S.C. 154(b) by 255 days.

(21) Appl. No.: 14/464,027

(22) Filed: Aug. 20, 2014

(65) Prior Publication Data

US 2015/0053299 A1    Feb. 26, 2015

(30) Foreign Application Priority Data

Aug. 21, 2013  (DE) .................... 20 2013 007 501 U

(51) Int. Cl.
| | |
|---|---|
| *F16L 11/12* | (2006.01) |
| *F01N 13/18* | (2010.01) |
| *F02C 6/12* | (2006.01) |
| *F16L 51/02* | (2006.01) |
| *F16L 55/033* | (2006.01) |
| *F16L 27/10* | (2006.01) |

(52) U.S. Cl.
CPC ............ *F01N 13/1816* (2013.01); *F02C 6/12* (2013.01); *F16L 27/10* (2013.01); *F16L 51/025* (2013.01); *F16L 55/0337* (2013.01); *F05D 2260/96* (2013.01)

(58) Field of Classification Search
CPC ....... F16L 55/0337; F16L 27/10; F16L 27/11; F01N 13/1811; F01N 13/1816
USPC ... 138/121, 122, 118, 119; 285/226, 299, 49
See application file for complete search history.

(56) References Cited

U.S. PATENT DOCUMENTS

| | | | | |
|---|---|---|---|---|
| 5,482,330 A | * | 1/1996 | Holzhausen | F16L 27/11 285/226 |
| 5,775,737 A | * | 7/1998 | Morgner | F01N 13/1811 285/301 |
| 5,984,372 A | * | 11/1999 | Cwik | F01N 13/1805 285/226 |
| 6,464,257 B1 | * | 10/2002 | Cwik | B21C 37/20 285/227 |
| 6,921,112 B2 | * | 7/2005 | Atansoski | F01N 13/1816 285/226 |
| 8,042,840 B2 | * | 10/2011 | Chahine | F16L 27/11 285/226 |
| 8,181,672 B2 | | 5/2012 | Weiss et al. | |
| 8,453,680 B2 | | 6/2013 | Weiss et al. | |

(Continued)

FOREIGN PATENT DOCUMENTS

| | | |
|---|---|---|
| DE | 43 17 334 C1 | 9/1994 |
| DE | 20 2006 003 789 U1 | 7/2007 |

(Continued)

*Primary Examiner* — Patrick F Brinson
(74) *Attorney, Agent, or Firm* — McGlew and Tuttle, P.C.

(57) ABSTRACT

In an uncoupling element for uncoupling vibrations of the turbocharger of an internal combustion engine from an exhaust system with a bellows, provisions are made, especially for achieving a lower stiffness with short overall length, for the bellows to be a diaphragm bellows.

20 Claims, 3 Drawing Sheets

(56) References Cited

U.S. PATENT DOCUMENTS

2002/0171240 A1* 11/2002 Cwik .................. F01N 13/1816
                                                            285/301
2008/0264509 A1   10/2008  Weiss et al.
2011/0209790 A1    9/2011  Weiss et al.
2012/0125192 A1    5/2012  Weiss et al.

FOREIGN PATENT DOCUMENTS

| DE | 10 2008 001 297 A1 | 10/2008 |
| DE | 10 2010 037 162 A1 | 3/2011 |
| DE | 10 2011 053 131 A1 | 5/2012 |
| DE | 10 2011 110 147 A1 | 2/2013 |

* cited by examiner

UNCOUPLING ELEMENT

CROSS REFERENCE TO RELATED APPLICATIONS

This application claims the benefit of priority under 35 U.S.C. §119 of German Utility Model Application DE 20 2013 007 501.5 filed Aug. 21, 2013, the entire contents of which are incorporated herein by reference.

FIELD OF THE INVENTION

The present invention pertains to an uncoupling element, especially for uncoupling vibrations of the turbocharger of an internal combustion engine from an exhaust system, with a bellows.

The uncoupling element according to the present invention is used especially to uncouple the vibrations generated by a turbocharger of an internal combustion engine from being transmitted to the adjoining exhaust system. It is installed between the turbocharger and the exhaust system. However, an uncoupling element according to the present invention may also be used in other applications for uncoupling small vibration amplitudes occurring (in the direction of the uncoupling element or the connection direction thereof) with vibration amplitudes in the range of a few micrometers (especially below 10 μm) between parts to be connected by the uncoupling element.

BACKGROUND OF THE INVENTION

The vibration amplitudes of a turbocharger are in the range of 3 μm to 5 μm with vibration frequencies of 500 Hz to 5,000 Hz, especially up to 1,500 Hz. In addition, the space available for installation is rather small at a turbocharger of an internal combustion engine in the axial direction (of the exhaust gas outlet of the turbocharger or of the exhaust system), so that bellows with great overall lengths cannot be used here.

SUMMARY OF THE INVENTION

The basic object of the present invention is to create an uncoupling element, which has a short overall length and brings about efficient uncoupling of vibrations, especially in the range of 500 Hz to 5,000 Hz, preferably up to 1,500 Hz, and thus a reduction of the noises generated by such vibrations during the vibration of an exhaust system.

This object is accomplished according to the present invention with an uncoupling element of the type mentioned in the introduction by the bellows being a diaphragm bellows.

Diaphragm bellows comprise individual ring parts, which are alternatingly connected tightly in substance, especially welded or soldered, with adjacent ring parts in their inner circumference and outer circumference. The rings and hence the flanks of the corrugations of such a diaphragm bellows may be smooth, preferably conical, or have a structure in themselves, especially a corrugated structure, so that provisions are preferably made for the flanks of the corrugations of the diaphragm bellows to extend in a corrugated manner in the radial direction (to be of a corrugated design in the axial section).

Diaphragm bellows may be used, for example, in measuring means or the like.

Within the framework of the present invention, a diaphragm bellows is a bellows formed from ring sections following each other in the axial direction, wherein adjacent ring sections are alternatingly connected with one another at the radial inner edge and radial outer edge such that inner and outer edge areas of the ring sections are in contact with one another, whereas middle areas (flank areas of the diaphragm bellows) of adjacent ring sections, which said middle sections are located radially between the inner and outer edge areas, have a finite axial distance. The ring areas may be individual rings connected with one another in substance (by welding or soldering) or sections of a one-piece metal bellows compressed in the shape defined above after corrugation. As was described above, the ring sections may be flat or profiled in their middle area (flanks of the corrugations).

The energy introduced into the system located downstream is minimized by the present invention by achieving a minimal bellows stiffness over a minimal overall length. An overall length that reduces the stiffness with increasing number of corrugations is needed for this, as a rule, with classical bellows solutions. The present invention makes it possible by means of a diaphragm bellows to introduce the length-dependent stiffness in a small available installation space. Efficient uncoupling is achieved by the present invention with a short overall length, especially in the high-frequency range (500 Hz to 5,000 Hz). A corrugated bellows with a stiffness comparable to that of a corresponding diaphragm bellows would require an overall length that would be several times greater, typically 3 to 6 times the overall length of the comparable diaphragm bellows, because of the greater corrugation pitch.

Provisions are made according to a preferred embodiment of the present invention for the overall length of the uncoupling element, including the bellows and optionally a damping pad, but without connection parts, to be 10 mm to 50 mm, preferably 20 mm to 40 mm, and the overall length of the bellows is especially 10 mm to 25 mm and preferably 10 mm to 20 mm.

Provisions are made in additional preferred embodiments for the pitch (length of one bellows corrugation) to be less than 4 mm and preferably less than 3 mm and/or for the number of corrugations of the bellows to equal 3 to 10 corrugations and preferably 5 to 8 corrugations. Provisions are made in an advantageous variant for the axial stiffness of the bellows to be less than 200 N/mm and preferably less than 100 N/mm, wherein the axial stiffness of the bellows is preferably 0.1 N/mm to 100 N/mm and preferably 1 N/mm to 10 N/mm.

An extremely preferred uncoupling element has a diaphragm bellows with 3 to 10 and preferably 5 to 8 corrugations, an overall length of 5 mm to 25 mm and preferably 10 mm to 20 mm.

Provisions are made according to a preferred embodiment of the uncoupling element according to the present invention for arranging a ring-shaped damping pad made of wire mesh in the flow of forces between the bellows and a connection element of the uncoupling element. Provisions are made for this, in particular, for a piece of tube with outwardly directed radial flanges arranged at axially spaced locations from one another to be fastened to one end of the diaphragm bellows and for a housing with inwardly directed radial flanges arranged at axially spaced locations from one another to be arranged at the other end of the diaphragm flange; for an outwardly directed radial flange and an inwardly directed radial flange each to be flush in the radial direction in the relaxed state of the uncoupling element; and for the tubular damping pad to be arranged between the radial flanges of the ring-shaped damping pad.

Provisions may be made according to another embodiment of the present invention for a guide tube to extend radially within the diaphragm bellows over at least the length of the diaphragm bellows, wherein the uncoupling element has, in particular, a connection tube, which expands towards its free end and is preferably connected with the guide tube.

Provisions are made in additional preferred embodiments for the diaphragm bellows to have a multilayer design and/or for the flanks of the corrugations of the diaphragm bellows to have a conical design, wherein the flanks of the corrugations of the diaphragm bellows extend, in particular, in a corrugated shape in the radial direction (have a corrugated design in the axial section).

Another preferred embodiment of the present invention provides for the nominal diameter (internal diameter of the bellows corrugations) to equal 30 mm to 100 mm and preferably 60 mm to 70 mm.

Moreover, preferred embodiments of the present invention are characterized in that the wall thickness of the diaphragm bellows is between 0.05 mm and 0.5 mm, preferably between 0.1 mm and 0.2 mm, and especially in that the diaphragm bellows has a multilayer design.

Provisions are made in another preferred embodiment for the axial thickness of the ring-shaped damping pad to be between 3 mm and 30 mm, preferably between 6 mm and 12 mm, and/or for the ring-shaped damping pad to have a density between 2 $g/cm^3$ and 5 $g/cm^3$ and preferably between 2.5 $g/cm^3$ and 3.5 $g/cm^3$.

Provisions are made in another preferred embodiment of the present invention for the damping to be at least 3 dB between 500 Hz and 1,500 Hz, wherein the damping is brought about especially by the damping pad.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
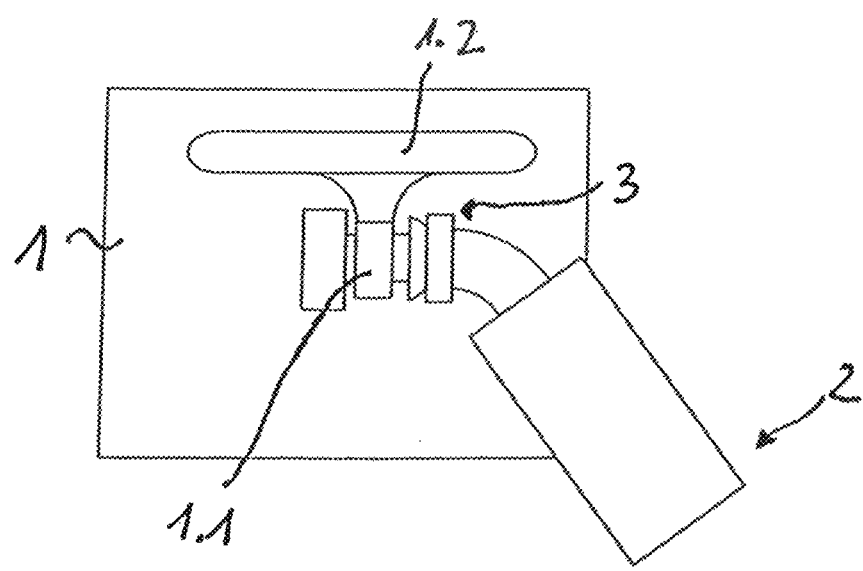
FIG. 1 is a schematic view showing the installation situation of an uncoupling element according to the present invention between the turbocharger and the exhaust system of a motor vehicle.

A turbocharger 1.1 is connected, on the one hand, with an engine 1 via an accumulator 1.2 and, on the other hand, with an exhaust system 2 of a motor vehicle. The air fed into the internal combustion engine for the combustion is compressed hereby in the internal combustion engine by means of the exhaust gases and is fed with recovered pressure into the cylinders of the engine. Space is limited. Since the operation of a turbocharger generates vibrations with a value of 500 Hz to 5 kHz and these vibrations are emitted as disturbing structure-borne noise, the exhaust system is sought to be uncoupled from the turbocharger in terms of vibrations as much as possible.

The present invention provides for this purpose for an uncoupling element 3, which is arranged between the turbocharger 1.1 and the exhaust system 2 and with which the axial vibrations of the turbocharger are damped and uncoupled from the exhaust system 2.

Figure 2:
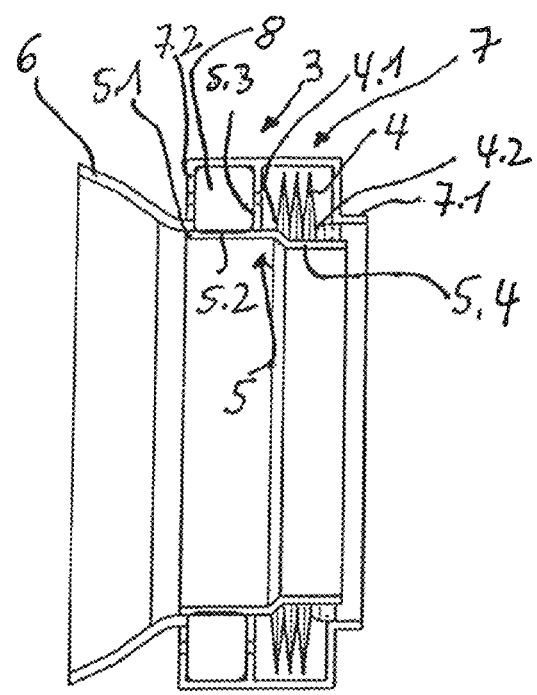
FIG. 2 is a longitudinal sectional view of an uncoupling element according to the present invention.

The uncoupling element 3 has a diaphragm bellows 4, which is connected with one of its ends 4.1, at its left-hand end in FIG. 2, with an inner tube 5, which extends, on the one hand, as a guide tube 5.4 within and through said bellows 4, and is connected, on the other hand, with its free end or piece of tube 5.1 extending away from the bellows with a connection tube 6, which extends, e.g., conically, for connection to the turbocharger. Two radial flanges 5.3 are provided over the free end area 5.2 of the tube 5 at axially spaced locations from the bellows 4 and from one another.

The bellows 4 is connected, furthermore, with its other end 4.2, the right-hand end in the exemplary embodiment being shown, with a housing part 7, which has, extending away from the bellows 4, a connection end 7.1 for connecting the uncoupling element 3 to the exhaust system. Furthermore, the housing part 7 is led, against the direction of the connection end 7.1, over the bellows radially outside the bellows up to over the radial flanges 5.3 of the inner tube 5. In the unstressed state of the bellows 4, the housing part 7 has inwardly projecting flanges 7.2, which are located opposite the radial flanges 5.3 and are thus likewise arranged at axially spaced locations relative to one another. A damping pad 8 made of pressed metal wire is inserted between the flanges 5.3, 7.2.

The axial flow of forces during vibrations of the turbocharger takes place, on the one hand, from the connection tube 6, the radial flanges 5.3 of the piece of tube 5.1, the damping pad 8, the axially directed inner flanges 7.2 of the housing 7, while shearing forces act on the damping pad 8, up to the connection end 7.1 of the uncoupling element 3 to the exhaust system, and, on the other hand, from the connection tube 6 to the turbocharger via the inner tube 5 to the bellows from the connection end 4.1 thereof and farther over the connection end 4.2 thereof to the connection pipe 7.1 to the exhaust system.

Figure 3:
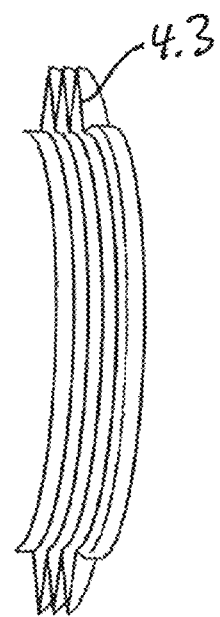
FIG. 3 is a side view of a bellows of a first embodiment of the uncoupling element according to the present invention.
Figure 4:
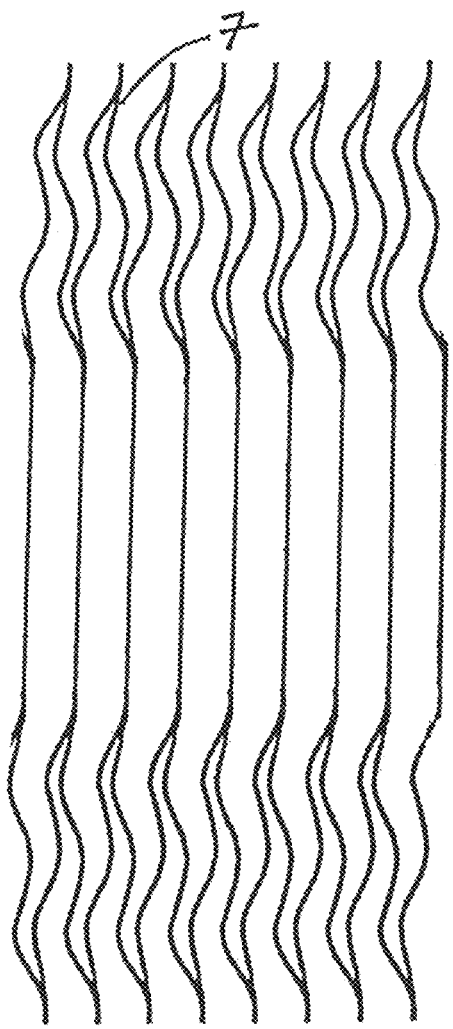
FIG. 4 is a sectional view of a bellows according to a second embodiment of an uncoupling element according to the present invention.

As was mentioned, the bellows 4 is a diaphragm bellows, as was defined in the introduction. The diaphragm rings 4.3 forming the diaphragm bellows may be, as can be determined especially from FIG. 3, conical disks inserted one into the other, or they may have a profiling of their own, as is the case in the diaphragm bellows according to FIG. 4, in which the individual rings have, in an axially parallel cross section, a shape selected to be a flame-like shape, the rings forming the corrugation flanks of the corrugations of the diaphragm bellows have a corrugated shape, especially with flat sinusoidal corrugations, in the axial cross section. The rings 4.3 of the diaphragm bellows 4 are alternatingly connected with one another in a gas-tight manner by their radially inner circumference and their radially outer circumference, preferably by gas-tight welding in the case of diaphragm bellows 4 formed from individual rings 4.3. The diaphragm bellows 4 may also have a one-piece design, in which case the individual ring disks are formed by shaping operations and pass over into an adjacent disk 4.3 in one piece at their radially inner and outer ring areas.

While specific embodiments of the invention have been shown and described in detail to illustrate the application of the principles of the invention, it will be understood that the invention may be embodied otherwise without departing from such principles.

What is claimed is:

1. An uncoupling element, comprising:
   a bellows, said bellows being a diaphragm bellows formed from ring sections following each other in an axial direction, wherein adjacent ring sections are alternatingly connected with one another at a radial inner edge and radial outer edge;
   a connection element;
   a ring-shaped damping pad made of wire mesh arranged in a flow of forces between said bellows and said connection element, said connection element being a connection tube, said diaphragm bellows being connected with one end with an inner tube which extends as a guide tube within and through said bellows and said guide tube is connected with said connection tube, wherein said bellows is connected with another end with a housing part, which has, extending away from said bellows, a connection end for connecting the uncoupling element to an exhaust system.

2. An uncoupling element in accordance with claim 1, wherein an overall length of the uncoupling element, including the bellows, without connection parts, is 10 mm to 50 mm.

3. An uncoupling element in accordance with claim 1, wherein an overall length of the bellows is 10 mm to 25 mm.

4. An uncoupling element in accordance with claim 1, wherein a pitch is less than 4 mm, wherein a length of at least one corrugation of the bellows defines said pitch.

5. An uncoupling element in accordance with claim 1, wherein said bellows comprises three to ten corrugations.

6. An uncoupling element in accordance with claim 1, wherein an axial stiffness of the bellows is less than 200 N/mm.

7. An uncoupling element in accordance with claim 6, wherein the axial stiffness of the bellows is 0.1 N/mm to 100 N/mm.

8. An uncoupling element in accordance with claim 1, further comprising:
   a piece of tube with outwardly directed radial flanges arranged at axially spaced locations from one another, said piece of tube being connected with one end of the diaphragm bellows, said housing part comprising inwardly directed radial flanges, said inwardly directed radial flanges being arranged at axially spaced locations from one another, one of said outwardly directed radial flanges and one of said inwardly directed radial flanges being aligned in a radial direction in an unstressed state of the uncoupling element, said ring-shaped damping pad being arranged between said one of said outwardly directed radial flanges and said one of said inwardly directed radial flanges.

9. An uncoupling element in accordance with claim 1, wherein said guide tube extends over at least a length of the diaphragm bellows radially within the diaphragm bellows.

10. An uncoupling element in accordance with claim 1, wherein said connection tube has a free end, said connection tube expanding towards said free end, said connection tube being connected with a guide tube extending through the bellows.

11. An uncoupling element in accordance with claim 1, wherein the diaphragm bellows comprises a multilayer design.

12. An uncoupling element in accordance with claim 1, wherein said diaphragm bellows comprises corrugations, said corrugations comprising flanks, said flanks of the corrugations of the diaphragm bellows comprising a conical design.

13. An uncoupling element in accordance with claim 1, wherein said diaphragm bellows comprises corrugations, said corrugations comprising flanks, said flanks of the corrugations of the diaphragm bellows extending in a corrugated pattern in a radial direction, whereby said flanks of the corrugations of the diaphragm bellows have a corrugated design in an axial section.

14. An uncoupling element in accordance with claim 1, wherein a nominal diameter is between 30 mm and 100 mm, said nominal diameter corresponding to an internal diameter of corrugations of said bellows.

15. An uncoupling element in accordance with claim 1, wherein a wall thickness of the diaphragm bellows is between 0.05 mm and 0.5 mm.

16. An uncoupling element in accordance with claim 1, wherein an axial thickness of the ring-shaped damping pad is between 3 mm and 30 mm.

17. An uncoupling element in accordance with claim 1, wherein said ring-shaped damping pad has a density between 2 $g/cm^3$ and 5 $g/cm^3$.

18. An uncoupling element in accordance with claim 1, wherein the uncoupling element uncouples vibrations of a turbocharger of an internal combustion engine from the exhaust system.

19. An uncoupling element in accordance with claim 18, wherein damping is at least 3 dB between 500 Hz and 1,500 Hz.

20. An uncoupling element, comprising:
   a diaphragm bellows comprising ring sections following each other in an axial direction of said diaphragm bellows, wherein adjacent ring sections are alternatingly connected with one another at a radial inner edge and a radial outer edge;
   a connection tube;
   a guide tube connected to said connection tube, at least a portion of said guide tube extending within an interior of said bellows, wherein said diaphragm bellows extends about said at least said portion of said guide tube;
   a housing comprising a housing interior and a housing part, said housing part comprising a connection end extending away from said bellows, said connection end comprising an exhaust system contact surface for contacting an exhaust system;
   a ring-shaped damping pad comprising wire mesh arranged in a force transmission path between said bellows and said connection tube, said ring-shaped damping pad and said diaphragm bellows being arranged in said housing interior, said diaphragm bellows comprising one end and another end, said one end being connected to said guide tube, said another end being connected to said housing part.

* * * * *